United States Patent
Albrecht et al.

(10) Patent No.: US 8,369,562 B2
(45) Date of Patent: Feb. 5, 2013

(54) ENCRYPTION METHODS FOR PATTERNED MEDIA WATERMARKING

(75) Inventors: Thomas Robert Albrecht, San Jose, CA (US); Zvonimir Z. Bandic, San Jose, CA (US); Jorge Campello de Souza, Cupertino, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1487 days.

(21) Appl. No.: 11/731,454

(22) Filed: Mar. 30, 2007

(65) Prior Publication Data

US 2008/0239534 A1  Oct. 2, 2008

(51) Int. Cl.
*G06K 9/00* (2006.01)

(52) U.S. Cl. ............... 382/100; 713/176; 369/53.21

(58) Field of Classification Search ............ 382/100; 369/53.21
See application file for complete search history.

(56) References Cited

U.S. PATENT DOCUMENTS

| | | | |
|---|---|---|---|
| 5,265,082 A * | 11/1993 | Gniewek et al. ........... 369/53.45 |
| 5,546,462 A | 8/1996 | Indeck et al. | |
| 5,615,061 A | 3/1997 | Singh | |
| 5,820,769 A * | 10/1998 | Chou ........................ 216/22 |
| 6,423,478 B1 | 7/2002 | Ha | |
| 6,535,469 B1 | 3/2003 | Heylen | |
| 6,560,176 B1 | 5/2003 | Heylen | |
| 6,980,387 B2 * | 12/2005 | Yoshizawa et al. ............ 360/69 |
| 7,069,246 B2 | 6/2006 | Stebbings | |
| 2002/0081413 A1 * | 6/2002 | DallaVerde ............... 428/64.2 |
| 2002/0146148 A1 | 10/2002 | Levy | |
| 2003/0198162 A1 | 10/2003 | Heylen | |
| 2004/0076789 A1 | 4/2004 | Ono et al. | |
| 2004/0100711 A1 | 5/2004 | Sato et al. | |
| 2004/0145986 A1 | 7/2004 | Taylor | |
| 2005/0008216 A1 | 1/2005 | Smith et al. | |
| 2005/0018875 A1 * | 1/2005 | Lubin et al. ................. 382/100 |
| 2005/0225890 A1 | 10/2005 | Sakurai et al. | |
| 2006/0026431 A1 * | 2/2006 | Campello De Souza ..... 713/176 |
| 2008/0141041 A1 * | 6/2008 | Molaro et al. ............... 713/193 |

FOREIGN PATENT DOCUMENTS

| | | |
|---|---|---|
| EP | 0810593 | 12/1997 |
| JP | 8077566 | 3/1996 |

* cited by examiner

*Primary Examiner* — John Strege
(74) *Attorney, Agent, or Firm* — Zilka-Kotab, PC

(57) ABSTRACT

Watermarks for patterned magnetic media. The watermarks are used to demonstrate the unauthorized replication of a patterned magnetic media. The watermarks include a dibit, a pattern in an open region, shifting of data, shifting of a sync mark and large length scale perturbations. Also described are methods to determine if a watermark appears on a patterned media.

17 Claims, 5 Drawing Sheets

ENCRYPTION METHODS FOR PATTERNED MEDIA WATERMARKING

BACKGROUND OF THE INVENTION

The heart of a computer's long term memory is an assembly that is referred to as a magnetic disk drive. The magnetic disk drive includes a rotating magnetic media (disk), write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

Patterned magnetic recording media have been proposed to increase the bit density in magnetic recording data storage, such as hard disk drives. In magnetic patterned media, the magnetic material is patterned into small magnetically isolated blocks or islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording", IEEE Transactions on Magnetics, Vol. 33, No. 1, Jan. 1997, 990-995.

Current plans for production of patterned media include creating a "gold" master disk at high cost and expense. From the "gold" master disk, several "silver" production masters are created. Lastly, production disks that are used in hard disk drives are created from the "silver" disks. However, the production disks in turn could also be used in a process to create additional production disks. What is needed is a method of watermarking the pattern on the patterned media to alert a producer when their production disks are used to create unauthorized additional production disks.

SUMMARY OF THE INVENTION

Described are watermarkings for patterned media for hard disk drives. These watermarkings will be part of the pattern of the "gold" pattern masters. Thus the watermarkings will be transferred from the "gold" pattern masters to the "silver" disks and then to the production disks. Each disk is relatively faithful replica of the expensive "gold" pattern master disk.

The watermarking can be designed so that it is difficult to locate and does not interfere with hard disk drive channel operation. Further, the watermarking is preferably immune to clean-up methods such as self assembly.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE INVENTION

The following description is of the best embodiments presently contemplated for carrying out this invention. This description is made for the purpose of illustrating the general principles of this invention and is not meant to limit the inventive concepts claimed herein.

Figure 1:
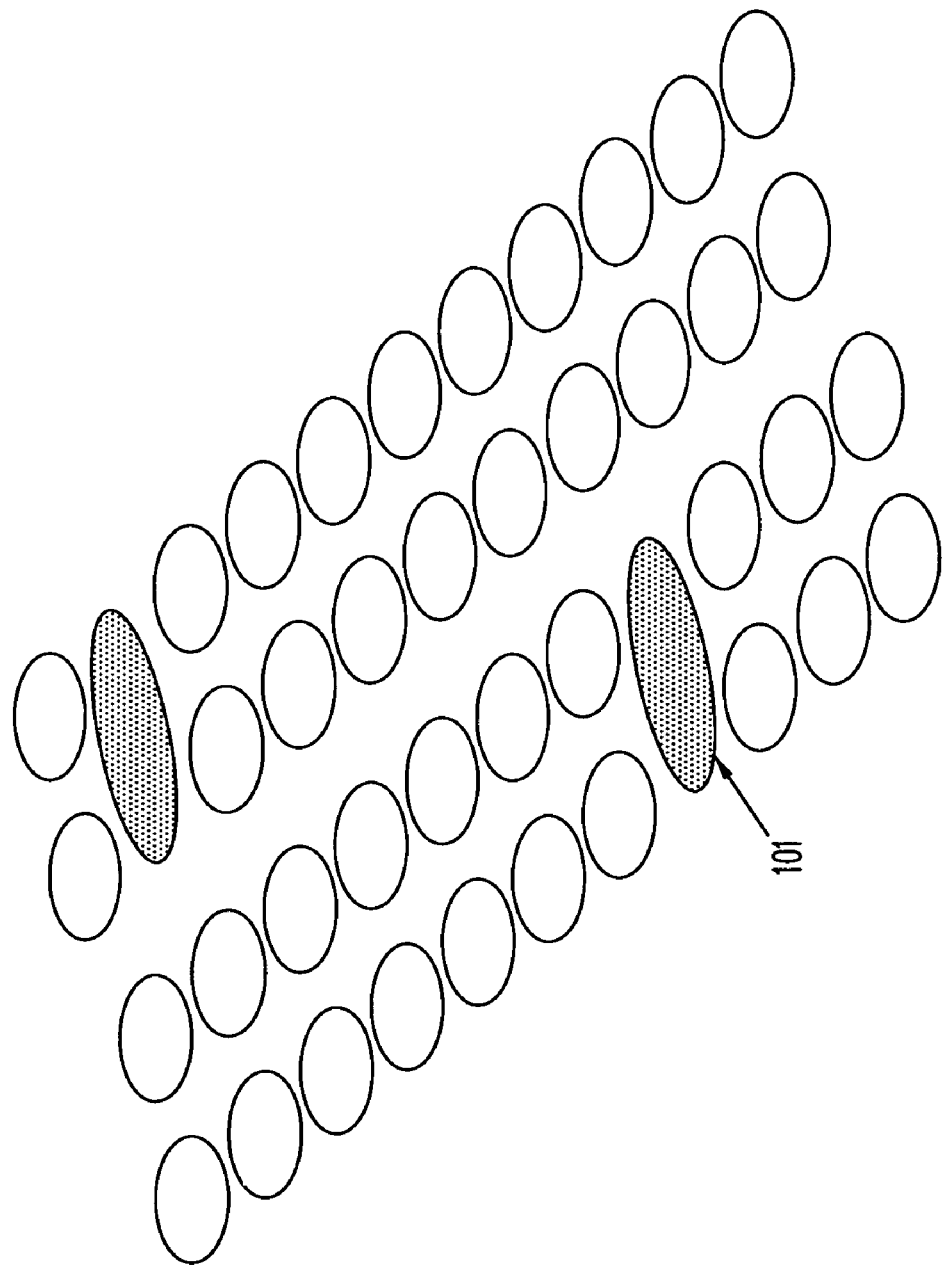
FIG. 1 is a diagram of a dibit watermark on a patterned media.

FIG. 1 is a diagram of a dibit watermark 101 on a patterned media. One or more dibit watermarks are embedded at pre-selected areas of the pattern format. The pre-selected areas of the format could include open areas between features within selected servo patterns. Since the watermarks are at known locations they can be easily searched for on production disks.

Figure 2:
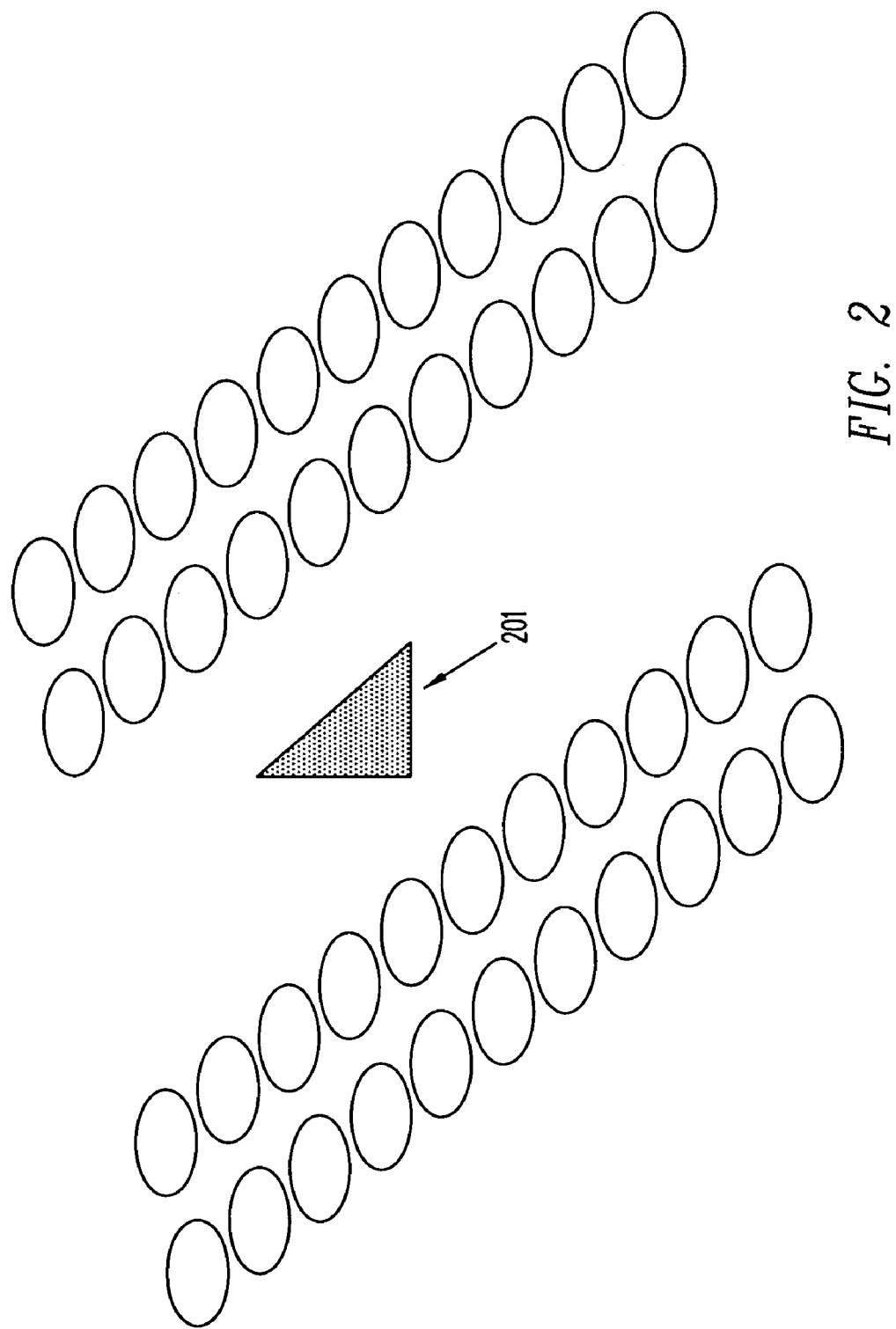
FIG. 2 is a diagram of a watermark in an open region of a patterned media.

FIG. 2 is a diagram of a watermark 201 in an open region of a patterned media. An open region is a region of the patterned media that would not normally include a feature. Typically, one can use write-to-read or read-to-write recovery regions available before the beginning of the servo sector, or after the end of the servo sector to locate these types of features. One or more watermarks in an open region of a patterned media are patterned at pre-selected areas of the pattern format. The pre-selected areas of the format could include regions between features within a servo pattern. Since the watermarks are at know locations they can be easily searched for on production disks and detected.

Figure 3:
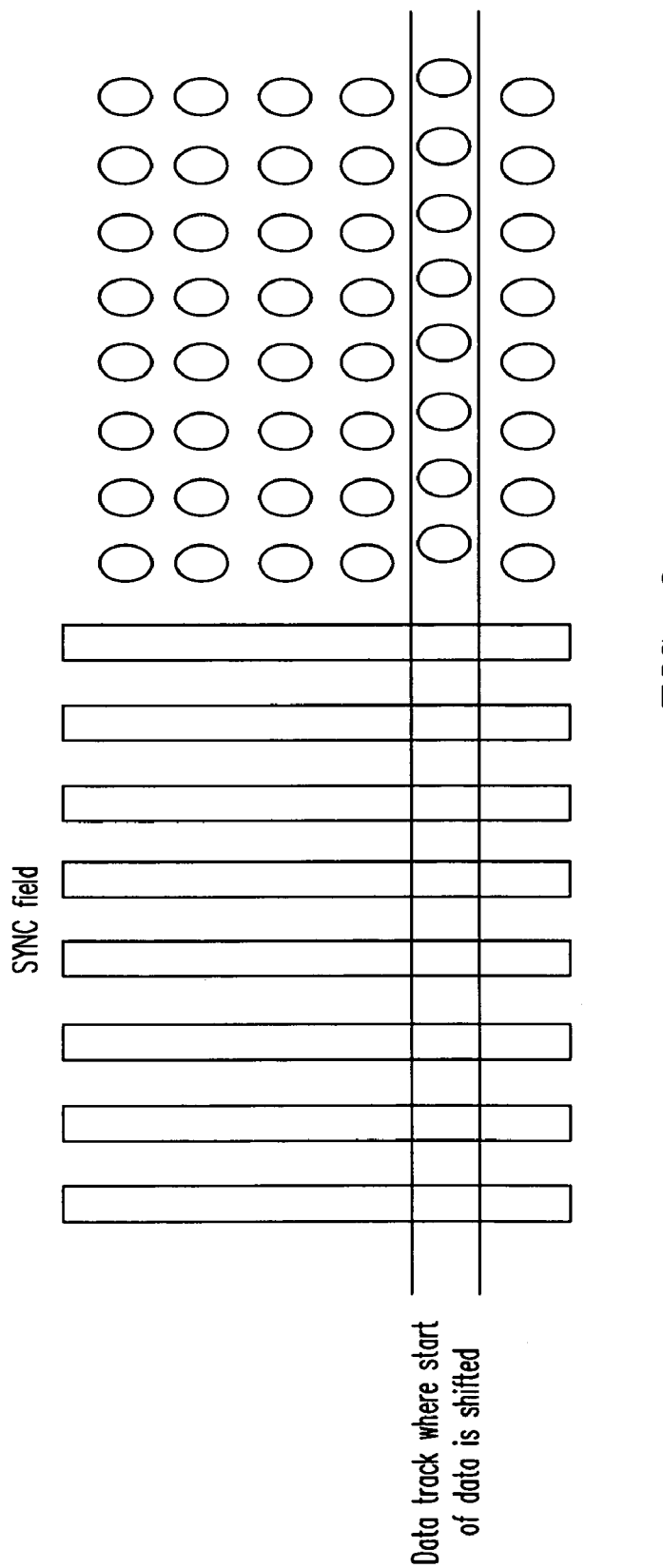
FIG. 3 is a diagram of a watermark where the spacing between the syncmark and the start of data (in one data track) is shifted at pre-selected locations.
Figure 4:
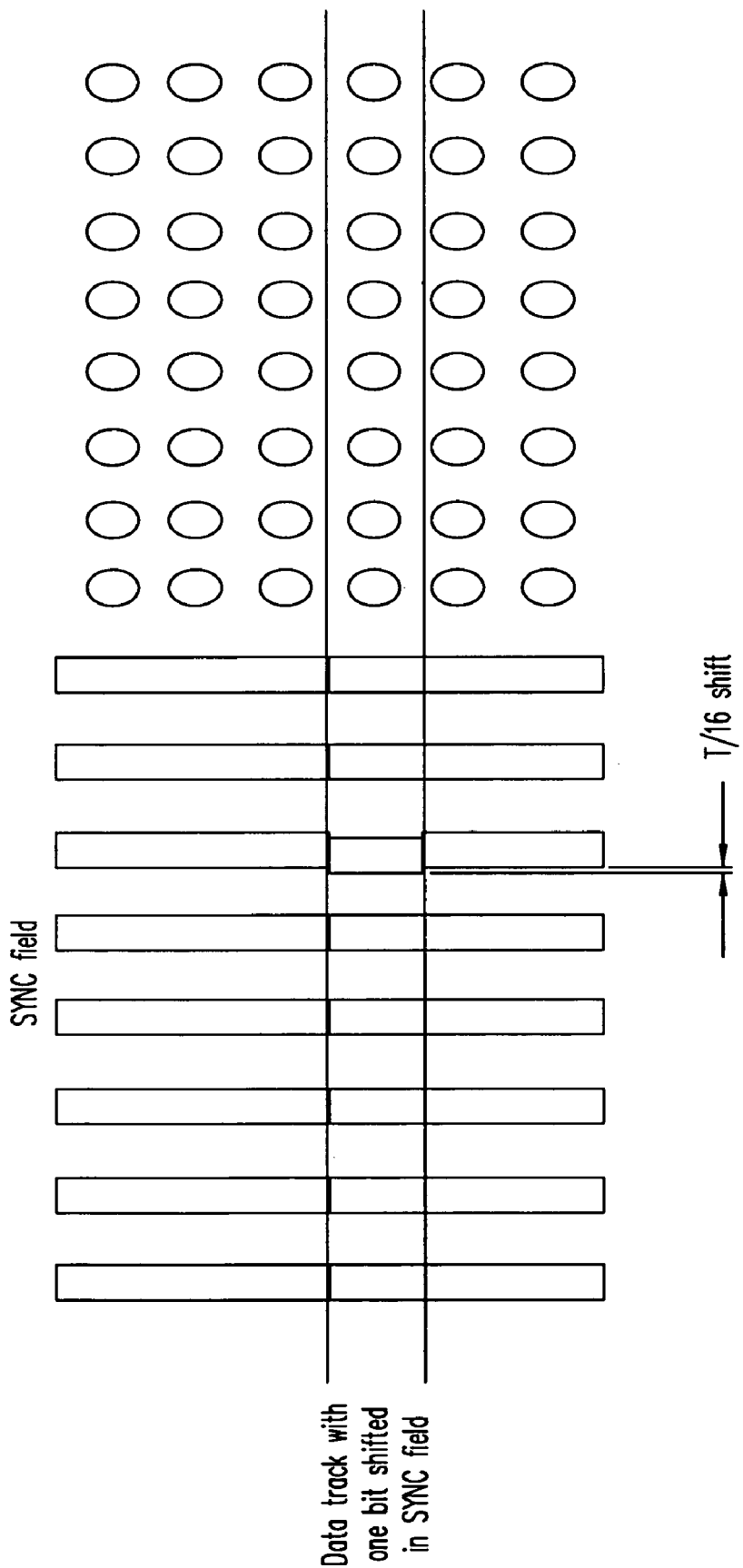
FIG. 4 is a second embodiment of a watermark where the location of one bit in the syncmark (in one data track) is shifted at pre-selected locations.

Another method of watermarking is shifting one or more features of a syncmark. For example, if the syncmark includes a number of equally-spaced magnetic transitions, a watermark can be created by shifting one transition or a group of transitions forward or backward along the track relative to the remaining transitions. Generally, if multiple features are shifted by small amounts, then shifting these multiple features allows for an easier determination of the existence of the watermark over shifting a single feature. FIGS. 3 and 4 show two examples of shifting one or more features of a syncmark.

FIG. 3 is a diagram of a watermark where the spacing between the syncmark and the start of data is shifted in one data track at pre-selected locations. Such a shift may be by +−T/8 or T/16. The pre-selected locations could include a known cylinder and sector number, and may or may not be close to each other. These watermarks may require the recording channel to be altered. The recording channel could be altered in the following way: when data is read at data location corresponding to a known data track and sector location, pre-compensation is introduced in a channel to counteract the shift introduced in the syncmark field. The altered locations may be fixed (permanently stored in the channel) or programmable. The search procedure for these marks uses knowledge of what type of bit shift has been implemented.

Case A) If the exact type of the bit shift amplitude and direction is known, the procedure is as follows: 1) Start the procedure with the first track on the disk; 2) Collect data from the first track; 3) Perform a correlation calculation between the signature typical for bit shift and the first track; 4) The peaks found in the correlation function will then correspond to the bit shift locations; 5) Repeat steps 1-4 for the rest of the tracks on the disk; and 6) Determine if peaks found in correlation function correspond to the actual bit shift locations of a watermark. This procedure calls for analysis of all the data that may be stored on the disk and all tracks.

Case B) If the type of the bit shift is not known, one has to assume the type of the shift employed, and then the use procedure for Case A. Alternatively, if the exact type of the shift is not known, in principle, the following procedure is possible to use: 1) Start the procedure with the first track on the disk; 2) Collect data from the first track; 3) Digitize the data and search for deviations from perfectly periodic signals; and 4) Repeat steps 1-3 for the rest of the tracks on the disk.

An example of the watermark of FIG. 3 is a disk with approximately one million tracks, where there are approximately 1000 sectors per track. Therefore there could be $10^9$ possible watermark locations. The designer of the disk could select $10^3$ locations to insert watermarks. The watermarks would introduce small phase shifts and allow for the encoding of 1000-bit words.

FIG. 4 is a second embodiment of a watermark where the location of one bit (or more than one bit) in the sync mark is shifted at pre-selected locations. Such a shift may be by +−T/8 or T/16. The pre-selected locations could include a known cylinder and sector number. These watermarks advantageously may not require the recording channel to be altered. The watermarking of FIG. 4 is accomplished by modifying the location of one bit or several bits by a small fraction at preseleced locations (known data track and sector number) in the sync mark. Since only one bit in one data track/sector number is slightly shifted (typically a sync mark field has up to several tens of bits), the functionality of sync field is not reduced or modified, and the channel may operate as usual. To locate the watermark, a scan of all sync fields in all data tracks and all sectors is implemented. The scan searches for bits that are shifted by a very small amount. Therefore the scan inspects billions of bits, and measure bit shifts with the sensitivity of $10^{-10}$ seconds. On the other hand, inspection of suspect disk using CD-SEM is quite possible, since the watermarking location is known.

An example of the watermark of FIG. 4 is a disk with approximately one million tracks, where there are approximately 1000 sectors per track. Therefore there could be $10^9$ possible watermark locations. The designer of the disk could select $10^3$ locations to insert watermarks. The watermarks would introduce small phase shifts and allows for the encoding of 1000-bit words.

Figure 5:
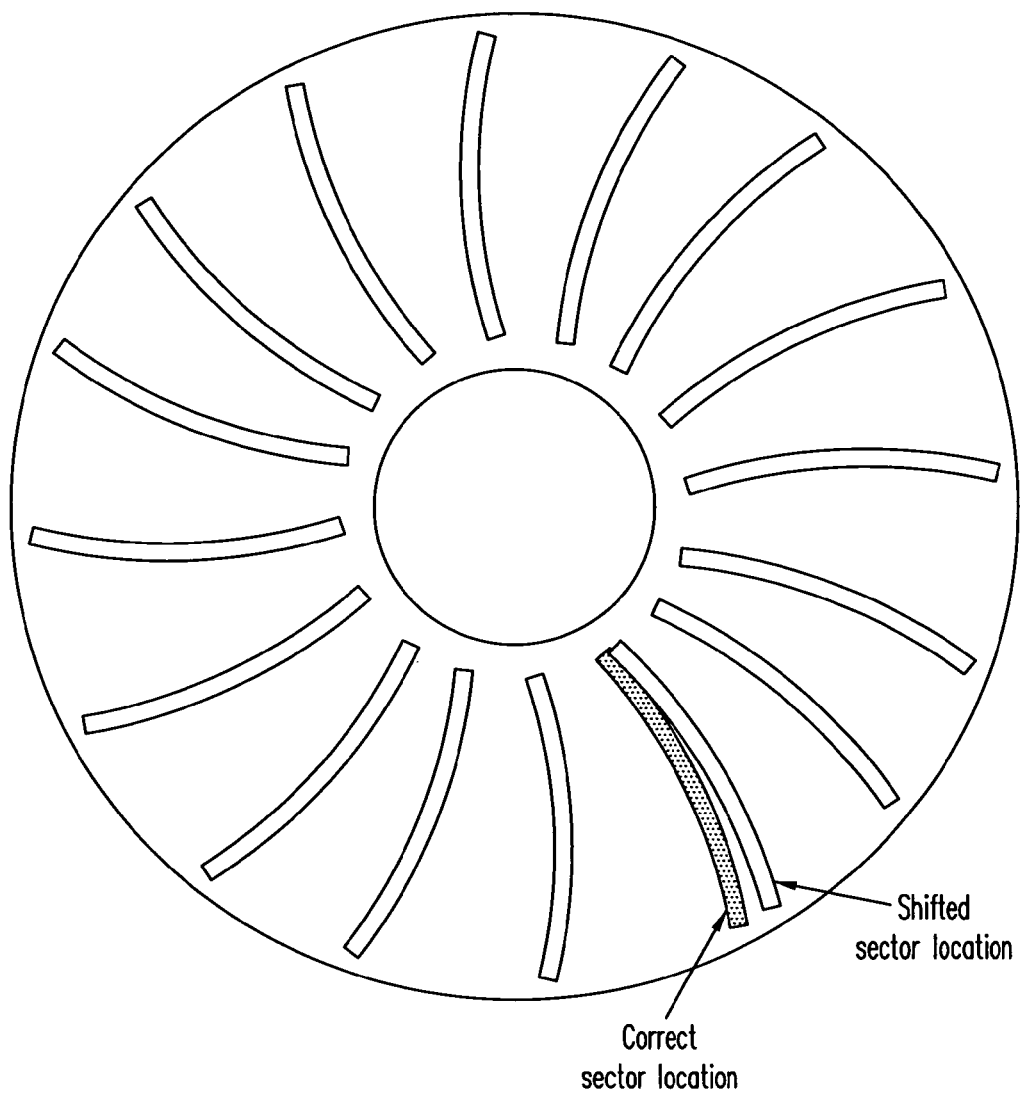
FIG. 5 is an example of a large length-scale servo sector alteration watermark.

FIG. 5 is an example of a large length-scale watermark. The watermark is a shifted sector location. This watermark modulates time spacing on a larger scale. First, the watermark modulates time spacing between each two consecutive sectors. Second, the time modulation is done inside a detection window. For example the detection window could be ~100 ns or 5 periods. Thus, one can encrypt information at $10^3$ out of $10^9$ locations and encode 1000-bit words.

There are additional advantages of the embodiment of FIG. 5. First, it is resistant to correction through self assembly since the introduced error is large length scale. Second, the small circumferential perturbation has no effect on the operation of a hard disk drive and thus does not require modification to the read channel or servo mechanisms.

Long-range radial perturbations to the sector location can also be made into watermarks. These include minor adjustments of the track pitch, or shifts of large groups of tracks by small amounts. These can be easily detected. Once the location of the watermarking is known, CD-SEM can be combined with high-resolution capture of the watermarking area to determine the existence of a watermark.

An example of a long-range radial perturbation watermark is shifting the positions of one or more complete zones relative to one another. For example, if the nominal track pitch is 40 nm, then at the boundary between Zone 1 and Zone 2, a pitch of 41 nm could be used, shifting these two zones relative to one another. In addition, to make detection of the watermark more difficult, a shift spread more gradually over a long range can be used. For example, the track pitch could be changed from 40.0 nm to 40.5 nm for a selected group of 1000 tracks or a whole zone. Any short range investigation will find no detectable shift, but if the width of the specific known group of tracks is measured, the increase in width spanned by the 1000 tracks from 40.0 μm to 40.5 μm will be easily detectable, if a suitably sensitive measurement instrument, such as a CD SEM, is used. Radial modulations can also be arbitrary and very complex, making detection even more difficult. For example, slight radial disturbances can be applied as a function of rotational position as well as radial position. Phase- or frequency-modulation of the pitch to encode any desired modulated information can be applied. Detection can be accomplished by digital image processing of SEM images, or by diffraction techniques such as x-ray diffraction.

If a master manufactures knows the watermarking location in advance, it can use a CD-SEM technique to inspect suspect disks and locate watermarks.

The various watermarking techniques described above may be used alone or in any combination of two, three or more.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A hard disk drive patterned media including:
   a pattern of small magnetically isolated blocks or islands of magnetic material such that each block or island is a single magnetic domain to store a bit of data; and
   a patterned media watermark,
   wherein the patterned media watermark is a shift of one bit in a syncmark,
   wherein the shift is by at least one of T/8, T/16, −T/8 and −T/16, wherein T is the period of the pattern.

2. The patterned media of claim 1, wherein the patterned media watermark is transferred to the disk during a manufacturing process of the patterned media.

3. The patterned media of claim 1, wherein the patterned media watermark is transferred to the patterned media from a master disk.

4. The patterned media of claim 3, wherein the transfer is accomplished by imprinting.

5. The patterned media of claim I , wherein the patterned media watermark is a dibit.

6. The patterned media of claim 1, wherein the patterned media watermark is in an open region of the patterned media.

7. The patterned media of claim 1, wherein the patterned media watermark is a shift in the spacing between a syncmark and a start of data.

8. The patterned media of claim 7, wherein the shift is by at least one of T/8, T/16, −T/8 and −T/16, wherein T is the period of the pattern.

9. The patterned media of claim 1, wherein the patterned media watermark is a large length-scale alteration.

10. The patterned media of claim 9, wherein the large length-scale alteration is a shift of a sector location.

11. The patterned media of claim 1, wherein the patterned media watermark is a shift of at least one feature in a syncmark.

12. The patterned media of claim 1, wherein the patterned media watermark is a change in the track pitch of a plurality of tracks.

13. The patterned media of claim 1, wherein the patterned media watermark is a shifting of a first group of tracks radially with respect to a second group of tracks.

14. A hard disk drive patterned media including:
a pattern of small magnetically isolated blocks or islands of magnetic material such that each block or island is a single magnetic domain to store a bit of data; and
a patterned media watermark, the patterned media watermark including at least one of a dibit, a mark in an open region, a shift in a syncmark, and a large length-scale alteration,
wherein the patterned media watermark is a shift of one bit in a syncmark,
wherein the shift is by at least one of T/8, T/16, −T/8 and −T/16, wherein T is the period of the pattern.

15. The patterned media of claim 14, including patterned media watermarks of at least two of a dibit, a mark in an open region, a shift in a syncmark, and a large length-scale alteration.

16. The patterned media of claim 15, including patterned media watermarks of at least three of a dibit, a mark in an open region, a shift in a syncmark, and a large length-scale alteration.

17. The patterned media of claim 1, wherein the patterned media watermark is part of the pattern.

* * * * *

UNITED STATES PATENT AND TRADEMARK OFFICE
CERTIFICATE OF CORRECTION

| | | |
|---|---|---|
| PATENT NO. | : 8,369,562 B2 | Page 1 of 1 |
| APPLICATION NO. | : 11/731454 | |
| DATED | : February 5, 2013 | |
| INVENTOR(S) | : Albrecht et al. | |

It is certified that error appears in the above-identified patent and that said Letters Patent is hereby corrected as shown below:

In the claims:

col. 4, line 61 replace "I," with --1,--.

Signed and Sealed this
Fourteenth Day of May, 2013

Teresa Stanek Rea
*Acting Director of the United States Patent and Trademark Office*